2,772,251

VULCANIZATION OF ACRYLIC ACID COPOLYMERS

John E. Hansen, North Wales, and Thomas J. Dietz, Philadelphia, Pa., assignors to the United States of America as represented by the Secretary of Agriculture No Drawing. Application March 14, 1951,
Serial No. 215,622

7 Claims. (Cl. 260—79.5)

(Granted under Title 35, U. S. Code (1952), sec. 266)

The invention herein described may be manufactured and used by or for the Government of the United States of America for governmental purposes throughout the world without the payment to us of any royalty thereon.

This invention relates to synthetic rubbers, particularly to synthetic rubbers produced from alkyl acrylate-acrylic acid copolymers, and provides a method for the production of vulcanized alkyl acrylate-acrylic acid copolymers capable of being used in place of rubber and having superior physical properties and enhanced heat resistance.

We have found that vulcanized synthetic rubbers can be obtained by heating an alkyl acrylate-acrylic acid copolymer at vulcanization temperature in the presence of a polyalkylene polyamine, or a mixture of such amines, as the sole curing or vulcanizing agent, essentially in accordance with the vulcanization procedures described by Hansen and Dietz in their application Serial No. 105,662 filed July 19, 1949, patent No. 2,579,492. We have further found that whereas alkyl acrylate homopolymers, and copolymers containing no other functional groups are not cured satisfactorily by vulcanization recipe utilizing sulfur in conjunction with an amine such as triethyl trimethylene triamine as the curing agent, the alkyl acrylate-acrylic acid copolymers can be cured by means of such recipe and yield vulcanizates similar to those obtained on using an amine as the sole vulcanizing agent.

The vulcanization method of this invention is applicable to the curing of polymeric products formed on conjoint polymerization of acrylic acid with at least one monomeric alkyl acrylate free of substituents in either the alkyl group or the acyl radical and containing up to 8 carbon atoms in the alkyl group, and is especially well adapted to the production of vulcanizates from copolymers of such alkyl acrylates wherein the alkyl group is a lower alkyl group, that is, contains not more than 5 carbon atoms. The method yields the most satisfactory results when applied to copolymers formed by polymerization of the aforesaid alkyl acrylates, singly or in combination, with about 5 to 15 percent of acrylic acid based on the total weight on the polymerizable components of the monomer mixture. The alkyl acrylate-acrylic acid copolymers adapted for use in the process of our invention may be produced by any conventional polymerization method such as by bulk, solution, suspension or emulsion copolymerization techniques. The polyalkylene polyamines suitable as vulcanizing or curing agents in our process include the polymethylenediamines and polyethyleneamines like ethylenediamine, diethylenetriamine, triethylenetetramine, tetraethylenepentamine, or hexamethylenediamine, which can be utilized singly or in combination as the sole vulcanizing agent. These amines can also be used in conjunction with sulfur in the production of the vulcanizates. Triethyl trimethylene triamine can also be utilized as a curing agent either alone or in combination with sulfur.

According to the method of this invention, a mixture of the alkyl acrylate-acrylic acid copolymer with a sufficient amount of the vulcanizing agent, preferably about 0.5 to 4.0 parts by weight of the polyalkylene polyamine, or about 0.5 to 4.0 parts triethyl trimethylene triamine and about 0.5 to 2.0 parts sulfur, per 100 parts copolymer, and which preferably also contains from about 1.0 to 2.0 parts by weight of a saturated fatty acid containing from 8 to 18 carbon atoms, per 100 parts copolymer and which may also include carbon black and other conventional rubber compounding ingredients, inert fillers, pigments, etc., is first milled on rubber compounding rolls, preferably at a temperature with the range of about 140° to 160° F., and is then vulcanized in accordance with methods commonly utilized in the production of natural and synthetic rubber vulcanizates by heating in suitable molds in a hydraulic platen press at temperatures of about 280° to 375° F.

As illustrative embodiments of a manner in which our invention may be practiced the following examples are given wherein all parts are by weight. Example I shows the production of alkyl acrylate-acrylic acid copolymers. Examples II through V show the production and characteristics of the vulcanized copolymers of this invention as compared with the corresponding products obtained from polyalkyl acrylates, shown in Examples VI through IX.

Example I

The monomer mixture, consisting of 90 parts ethyl acrylate and 10 parts acrylic acid, 200 parts of distilled water and 2.5 parts sodium lauryl sulfate used as the emulsifier were mixed and heated to 80° C. with agitation and in a nitrogen atmosphere and polymerization was then initiated by addition of 0.00625 parts potassium persulfate catalyst, and was substantially completed within 30 minutes to 1 hour at 80° C. The emulsion so obtained was coagulated at 80° C in a 15 percent solution of sodium chloride containing sufficient hydrochloric acid to cause flocculation of the polymeric material, which was washed with distilled water and dried in a circulation air oven at 40° C. until no appreciable odor of monomer was present which usually is attained within 24 to 72 hours.

Other copolymers such as butyl acrylate-acrylic acid copolymers, were prepared in the same manner, as well as the polymeric alkyl acrylate used for comparative curing tests shown hereinafter.

If the polymerization is conducted at a temperature above 80° C., for instance at 80° C. to reflux temperature, the use of nitrogen as a polymerization atmosphere can be omitted. Other polymerization catalysts such as ammonium persulfate and hydrogen peroxide can be used in place of potassium persulfate, and supplementary catalyst added during the course of the polymerization promotes the conversion without adversely affecting the properties of the resulting copolymers. Coagulation of the latex can also be effected by means of the conventional alum precipitation technique. Conversion to the polymeric products were in general of the order of 60 to 80 percent.

The alkyl acrylate-acrylic acid copolymers so obtained and the alkyl acrylate homopolymers prepared by the same method for use in comparative vulcanization tests, were each compounded, cured and tested in accordance with standard ASTM procedures. (Designations: D15-41; D412-41; and D471-46T. Method B. The pertinent data and results are shown on the following table.

*Comparative curing of alkyl acrylate polymers and alkyl acrylate-acrylic acid copolymers*

| Example | II | III | IV | V | VI | VII | VIII | IX |
|---|---|---|---|---|---|---|---|---|
| Polymeric Material, Parts: | | | | | | | | |
| Copolymer—90% ethyl acrylate, 10% acrylic acid | 100 | 100 | | | | | | |
| Copolymer—90% butyl acrylate, 10% acrylic acid | | | 100 | 100 | | | | |
| Polyethyl acrylate | | | | | 100 | 100 | | |
| Polybutyl acrylate | | | | | | | 100 | 100 |
| Compounding Formula, parts: | | | | | | | | |
| Sulfur | | 1.5 | | 1.5 | | 1.5 | | 1.5 |
| Triethyl trimethylene triamine | | 2 | | 2 | | 2 | | 2 |
| Triethylene Tetramine | 2 | | 2 | | 2 | | 2 | |
| Stearic Acid | 1 | 1 | 1 | 1 | 1 | 1 | 1 | 1 |
| SRF black | 50 | 50 | 50 | 50 | 50 | 50 | 50 | 50 |
| Vulcanization time at 298° F., min | 60 | 60 | 60 | 60 | 60 | 60 | 60 | 60 |
| Properties of Vulcanizate: | | | | | | | | |
| Tensile strength, p. s. i | 1,490 | 1,290 | 1,000 | 1,450 | 1,160 | (1) | 500 | (1) |
| Ultimate Elongation, percent | 190 | 400 | 430 | 470 | 650 | (1) | 920 | (1) |
| Modulus at 100%, p. s. i | 940 | 500 | 190 | 210 | 70 | (1) | 50 | (1) |
| Durometer | 75 | 62 | | 49 | 44 | (1) | | (1) |

[1] No cure.

Polymeric products having properties similar to those of the alkyl acrylate-acrylic acid copolymers, are also obtained on subjecting homo- or copolymers formed on polymerization of alkyl acrylates, by conventional methods, to partial hydrolysis. This may be effected for example by the following procedure. The dry polymeric alkyl acrylate is dissolved in methyl ethyl ketone at 80° C. to give a solution containing about 10 percent solids, mixed with concentrated hydrochloric acid in the proportions of 8 parts methyl ethyl ketone to 1 part hydrochloric acid, and the mixture maintained at 80° C. for 2 hours with constant stirring. The partially hydrolyzed polymer is then precipitated by dropping the acid solution in a fine stream, into a 50:50 mixture of methanol and distilled water at room temperature. The precipitate is washed with distilled water until the wash water is neutral, and is then dried in an air oven for 48 hours at 48° C. The partially hydrolyzed alkyl acrylate polymer so obtained can be cured essentially as described in the foregoing Examples III and V, using sulfur in conjunction with triethyl trimethylene triamine as the vulcanizing agent. Tests of the resultant vulcanizates showed that on the basis of equal modulus, the ultimate strength of the partially hydrolyzed, cured, products is higher, particularly for the higher states of cure, than that of the controls produced by curing under identical conditions the corresponding unhydrolyzed polymeric alkyl acrylates.

We claim:
1. A process of preparing a synthetic rubber comprising compounding a polyalkylene polyamine with a copolymerized mixture of acrylic acid and at least one alkyl acrylate containing not more than 8 carbon atoms in the alkyl group, said acrylic acid and acrylate being present in the copolymerized mixture in the proportions by weight of from 5 to 15 percent of the acrylic acid and from 95 to 85 percent of the acrylate, and then heating the resulting compounded mixture to effect vulcanization.

2. The process of claim 1 wherein the polyalkylene polyamine is triethylene tetramine.

3. The process of claim 1 wherein the polyalkylene polyamine is triethyl trimethylene triamine.

4. The process of claim 1 wherein the polyalkylene polyamine is triethyl trimethylene triamine used in conjunction with sulfur.

5. The process of claim 1 wherein the polyalkylene polyamine is triethyl trimethylene triamine and the acrylate is ethyl acrylate.

6. The process of claim 1 wherein the polyalkylene polyamine is triethyl trimethylene triamine and the acrylate is n-butyl acrylate.

7. The process of preparing a synthetic rubber comprising compounding a polyalkylene polyamine with a copolymerized mixture of a major proportion of an alkyl ester of acrylic acid containing from 1 to 4 carbon atoms in the alkyl group and a minor proportion of acrylic acid, and then heating the resulting compounded mixture to effect vulcanization.

References Cited in the file of this patent

UNITED STATES PATENTS

| | | |
|---|---|---|
| 1,984,417 | Mark | Dec. 17, 1934 |
| 2,160,054 | Bauer | May 30, 1939 |
| 2,395,507 | Sauser | Feb. 26, 1946 |
| 2,412,476 | Semegen | Dec. 10, 1946 |
| 2,449,612 | Mast | Sept. 21, 1948 |
| 2,600,414 | Mast | June 17, 1952 |